United States Patent [19]
Martel, Jr.

[11] Patent Number: 5,250,192
[45] Date of Patent: Oct. 5, 1993

[54] SLUDGE DEWATERING BY FREEZING

[75] Inventor: Courtland J. Martel, Jr., Enfield, N.H.

[73] Assignee: The United States of America as represented by the Secretary of the Amry, Washington, D.C.

[21] Appl. No.: 414,228

[22] Filed: Sep. 29, 1989

Related U.S. Application Data

[60] Division of Ser. No. 173,015, Mar. 23, 1988, abandoned, which is a continuation of Ser. No. 861,811, May 12, 1986, abandoned, which is a division of Ser. No. 611,570, May 18, 1984, abandoned.

[51] Int. Cl.$^5$ .............................................. C02F 11/20
[52] U.S. Cl. ..................... 210/737; 210/609; 210/774
[58] Field of Search ............... 210/609, 774, 737, 747, 210/773, 179; 422/254, 258

[56] References Cited

U.S. PATENT DOCUMENTS

| | | | |
|---|---|---|---|
| 2,174,873 | 10/1939 | Downes et al. | 210/609 X |
| 2,202,696 | 5/1940 | Lafeuille | 422/254 X |
| 3,745,782 | 7/1973 | Neyhart et al. | 210/774 X |
| 3,880,756 | 4/1975 | Raineri et al. | 210/774 X |
| 4,127,388 | 11/1978 | Maczko et al. | 422/258 |

FOREIGN PATENT DOCUMENTS 1459175 12/1976 United Kingdom ............... 210/609

*Primary Examiner*—Tom Wyse
*Attorney, Agent, or Firm*—Darrell E. Hollis

[57] ABSTRACT

A method and apparatus for dewatering sludges and/or concentrating suspended and dissolved impurities in solutions by simultaneously freezing and rotating same. Rotation of the sludge is accomplished in a rotatable cylindrical apparatus capable of controlled rotational rate sufficient to continuously maintain a thin layer of water between suspended particulate impurities and an ice front which forms on inner cylindrical surfaces of the cylindrical apparatus. The ice front moves progressively inwardly to displace the suspended impurities toward the center of the cylindrical apparatus, thereby concentrating the sludge both by this displacement and by the removal of liquid water from the sludge. The concentrated sludge is discharged from the cylindrical apparatus when the rotation of said apparatus becomes insufficient to maintain the thin water layer between the ice/sludge interface. The annular, cylindrical body of ice is removed by heating of external surfaces of the cylindrical apparatus to cause the ice to slide from said apparatus. The low temperatures required for ice formation can be derived from the natural cold temperatures of the winter months in appropriate locations.

16 Claims, 2 Drawing Sheets

SLUDGE DEWATERING BY FREEZING

STATEMENT OF GOVERNMENT INTEREST

The invention described and claimed herein may be manufactured and used by or for the Government of the United States of America for governmental purposes without the payment of royalties thereon or therefore.

This is a division of application Ser. No. 07/173,015, filed 23 Mar. 1988, now abandoned; which is a continuation of application Ser. No. 06/861,811, filed May 12, 1986, now abandoned; which is a division of 06/611,570, filed May 18, 1984, now abandoned.

BACKGROUND OF THE INVENTION

1. Field of the Invention

The invention relates generally to methodology and apparatus for dewatering sludge and for concentrating liquid suspensions, the invention particularly relating to accomplishment of such functions by subjection of the sludge to freezing temperatures while rotating the suspension.

2. Description of the Prior Art

Sludge dewatering presents a major waste water treatment problem at all waste water treatment facilities regardless of the age and treatment modalities of the system. On average, more than half of the total cost of waste water treatment can be attributed to sludge handling and disposal. An energy efficient dewatering technology could substantially reduce waste water treatment cost. Recognizing this, previous efforts have been directed to development of mechanical dewatering apparatus, particularly for sludge dewatering and also for other water purification steps. It has long been known that the freezing of an aqueous solution containing impurities can be utilized on a small scale to separate water from the solution. Such prior methodology requires freezing at a controlled rate to form pure ice crystals which are then separated from the impurity-containing residual solution, thereby removing water from the original solution as well as concentrating the impurities within the residual solution. This prior freeze technology is somewhat less than practical due to the large amounts of energy required for freezing and, in some cases, even for thawing of the ice. The art has experienced a long felt need for methodology and apparatus capable of taking advantage of the natural freezing conditions which exist seasonally in most areas of the United States. Such methodology and apparatus would also need to be amenable to use with the more economical methods of artificial freezing.

Examples of prior art systems directed to the problem noted above can be seen in a number of United States patents including U.S. Pat. No. 3,385,074 to Aronson wherein a system for extracting a relatively pure solvent from a solution is disclosed. A solvent such as water is flash frozen by Aronson to form crystals, thereby increasing the concentration of solute in the non-frozen portion which remains. Aronson includes in his process the centrifugation of the resulting material at high speed to separate the concentrated solute from adhered ice crystals.

Dreyer, in U.S. Pat. No. 3,400,548, discloses a process for the separation of crystals of 2,6-dimethylnaphthalene from solutions containing a plurality of dimethylnaphthalenes. A rotating drum with a surface cooled below the crystallization point of 2,6-dimethylnaphthalene continuously moves the surface of the drum away from contact with the liquid composition at a rate sufficient to form a solid layer of crystals on its surface.

U.S. Pat. No. 3,001,293 to Wendt discloses a process and apparatus for dewatering sludges, the process utilizing centrifugation steps which prevent losses of suspended materials. Cleveland, in U.S. Pat. No. 2,149,252, discloses a centrifugal process and apparatus for dewatering material which is adaptable for dewatering activated or other sewage sludges. In Cleveland, water is forced contracentrifugally towards the axis of the centrifuge and then through a filter for discharge.

Hultsch, in U.S. Pat. No. 4,101,421, and Wilson et al, in U.S. Pat. No. 3,814,246, disclose methods for centrifugally removing liquid from a mixture through use of a centrifuge equipped with a rotating screen or filter. Many other references exist in the art to a freeze-thaw treatment of materials including materials such as sewage sludges, such freeze-thaw treatments often including a centrifugation step to which the frozen sludge is subjected. Such patents include the following U.S. Pat. Nos.:

3,681,931, Hadzeriga
3,803,861, Ganiaris
3,817,048, Burley
3,820,349, Styron et al
3,885,399, Campbell Netherlands patent 73 12616 also discloses a centrifugal separation of sludge-like materials.

The prior art, including those patents noted above, do not provide methodology and apparatus that is capable of dewatering sludges in an economical fashion by freezing of said sludges while rotating the sludges within a cylindrical container, a process particularly taught according to the present invention as efficiently dewatering sludges and/or concentrating impurities in aqueous materials. The present technology also allows for advantageous use of naturally existing low temperatures during certain seasons of the year and also for taking advantage of economical artificial methods of producing temperatures capable of freezing aqueous sludges and similar materials. The present invention is thus seen to provide advantages over the prior art and to contribute to cost reduction of sludge handling in waste water treatment facilities.

SUMMARY OF THE INVENTION

The invention provides methods and apparatus for dewatering sludges in waste water treatment processes by subjecting the sludge to freezing temperatures while rotating the sludge in a cylinder at a controlled rate of rotation. While particularly useful in the dewatering of sludges, the invention is also useful in the separation of water or similar solvent from a solution of said solvent wherein impurities are suspended or "dissolved" in the nature of particulates whether fine or otherwise. The invention can also be used to concentrate suspended materials in "solution" by removal of water therefrom according to the freeze/rotation method of the invention. As herein intended, the term "sludge" refers to the various types of sludges encountered in waste water treatments including raw primary sludge, digested sludge, activated sludge, etc. Further, the term "sludge" as herein intended refers to solutions, aqueous and otherwise, containing impurities which are in the nature of suspended solids and also in the nature of dissolved materials which can be at least partially separated from solution by the formation of crystals of the solvent medium. While water is particularly intended to comprise the solvent in those "sludges", suspensions, solutions, etc. with which the invention intends usage, it is to be recognized that other solvents, especially solvents having reasonably similar freezing points, can be utilized according to the invention.

The invention is partially based upon the known property of an impurity-containing solution which, when frozen, tends to separate solvents from impurity by the formation of pure solvent crystals, particularly in those situations wherein aqueous solutions are subjected to freezing to form pure ice crystals. In the practice of the present invention, a "sludge", particularly an aqueous sludge according to the invention, is placed in the interior of a cylindrical container, the container being rotated at a controlled rate while the sludge is subjected to a temperature capable of freezing the solvent. The rate of rotation of the cylinder is controlled such that a thin layer of water is continuously present between the suspended particles comprising the impurities and an ice front which forms on arcuate interior walls of the cylindrical container. Since the cylindrical container is rotated about its longitudinal axis, the ice layer which forms takes the shape of an annular cylindrical body of revolution, the outermost layers of the ice respectively adhering to the inner wall surfaces of the cylindrical container with the ice front pushing inwardly towards the center of the cylindrical container, thereby pushing the suspended particles of impurities toward the center of said container. As the sludge becomes more concentrated, a point is reached where the rotation of the cylindrical container can no longer maintain the thin layer of water at the interface between the concentrated sludge and the ice front. Rotation of the cylindrical container is then discontinued and the concentrated sludge remaining in the central portion of the container is poured out of or discharged from the container. The annular ice body remaining within the cylindrical container is then discharged by elevation of the temperature at least over the outer surface of the body of ice to cause the ice to slide from the cylindrical container. The ice thus produced can be stored in a lined lagoon or otherwise melted for reprocessing or discharge.

The present invention can take advantage of naturally occurring low temperatures which are at least seasonal in order to dewater sludge at a minimum energy expenditure. The cylindrical container of the invention can be rotated in contact with ambient air which exists at a temperature below the freezing temperature of the solvent, particularly water, which is to be removed from the sludge. The frozen water removed from the present apparatus can then be maintained in storage in a facility such as a lined lagoon wherein the melting takes place in warmer seasons or due to incident solar energy or the like. The present invention can thus be utilized on a large scale to dewater sludge or similar materials with a minimum energy expenditure.

Accordingly, it is an object of the present invention to provide methods and apparatus for dewatering sludges or similar materials to remove solvents, particularly water, from such sludges at a minimum energy expenditure.

It is another object of the present invention to provide methods and apparatus for dewatering sludges, particularly sludges encountered in waste water treatment, by subjecting the sludges to freezing temperatures while rotating said sludges, thereby to form ice which is separated from the sludges due to the rotation of the materials.

It is a further object of the invention to provide method and apparatus for dewatering sludges or similar materials by subjecting the sludges to freezing temperatures in a cylindrical container, the cylindrical container being rotated at a rotational rate sufficient to maintain a thin layer of water between a layer of ice which forms on inner wall surfaces of the cylindrical container and the sludge itself which becomes more concentrated during the dewatering process.

Further objects and advantages of the invention will become more readily apparent in light of the following detailed description of the preferred embodiments.

DESCRIPTION OF THE PREFERRED EMBODIMENTS

Figure 1A:
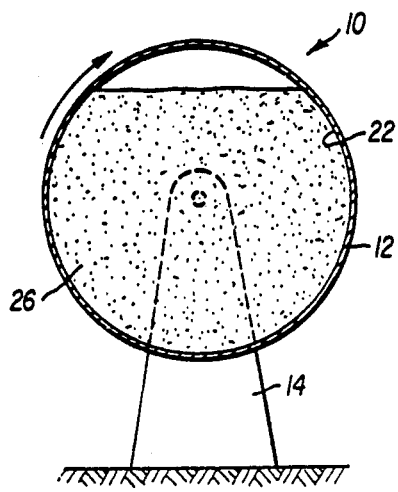
FIGS. 1A through 1D are schematics illustrating the operation of the present apparatus and the several embodiments thereof, the drawings showing a simplified embodiment for ease of illustration of the method of the invention; and, FIG. 2 is an idealized perspective illustrating a further embodiment of the invention wherein a plurality of cylindrical containers are each rotated within one apparatus for dewatering sludge.
Figure 1B:
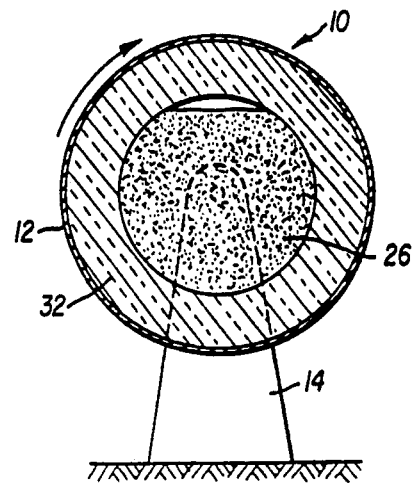
Figure 1C:
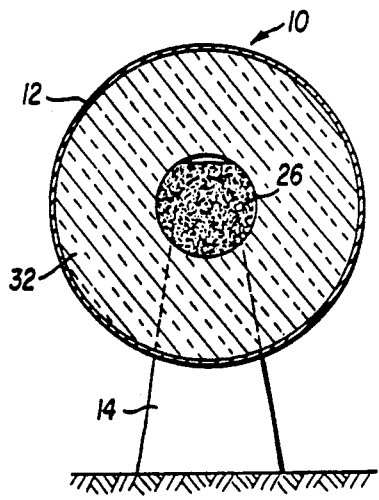
Figure 1D:
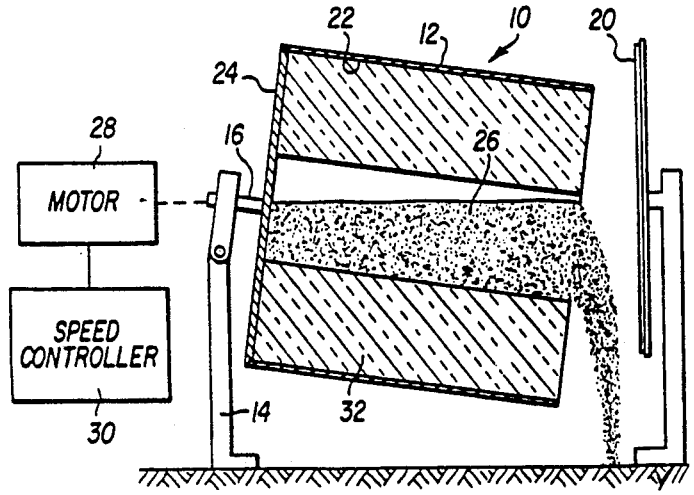

Referring now to FIGS. 1A through 1D, the apparatus of the invention is seen in simplified form at 10 to comprise a cylindrical container 12 mounted for rotation on mounts 14 which conventionally mount stubshafts 16 and 18. At least one end of the cylindrical container 12 is closed by a removable cap 20 which allows access to the interior of the container 12. The container 12 can be formed of any suitable material having the necessary rigidity and resistance to the sludges which are to be processed within the container 12. The cylindrical container 12 is hollow and thereby has an inner wall 22 which defines with the end cap 20 and cap 24 at the opposite end thereof a chamber 26 into which a sludge according to the invention is charged with substantially the full volume of the chamber 26 being filled with the sludge material which is to be dewatered. The rotation of the cylindrical container 12 is effected by motor 28 and the rate of rotation of the container 12 is controlled by speed controller 30 which acts to control the motor 28 to provide for rotation of the cylindrical container 12 at a constant speed which can be selected as desired according to temperature. A given rotational rate of the cylindrical container 12 can be selected regardless of temperature, the important element being the rotation of the container 12 at a rate which acts to maintain a thin layer of water between a layer of ice which forms on the walls 22 and the progressively more concentrated sludge which is contained centrally within the container 12.

In operation, a layer 32 of ice is seen to form on the inner wall 22 of the container as the cylindrical container 12 is rotated while being subjected to temperatures which are sufficient to freeze water, the sludge charged into the chamber 26 being taken for purposes of illustration to be an aqueous sludge which is to be dewatered. As the ice layer 32 forms on the inner wall 22, the solids contained in the sludge are forced toward the center of the cylindrical container 12 and thus become more concentrated within that portion of the liquid dispersion which remains in non-frozen form. Since a thin layer of water is constantly maintained between the interface of the ice layer 32 and the sludge, ice crystals are caused to form from the water layer, thereby reducing the possibility of entraining solids in the ice layer 32.

As the sludge within the decreasing volume of the chamber 26 becomes further concentrated, the thickness of the ice layer 32 grows, the ice layer 32 then defining a progressively smaller "chamber" or volume within which the sludge resides. The sludge becomes more concentrated not only due to the forced movement of solids toward the center of the container 12 but also due to the removal of water from the sludge by the ice formation. On concentration of the sludge to a point where a thin layer of water cannot be maintained at the ice layer 32/sludge interface, further dewatering of the sludge becomes impractical and rotation of the container 12 is discontinued. The removable cap 20 is then taken from the container 12 such that the sludge held within the reduced chamber defined by the ice layer 32 can be poured from the container 12 and disposed of, the sludge being substantially dewatered through the processing thus described. The ice layer 32 can be removed from the container 12 by heating of the walls of the container 12, such as by resistance heating, in order to melt a thin layer of the ice layer 32 contiguous to the wall 22, thereby causing the ice layer 32 to disengage the wall 22 and to slide from the container 12. The ice thus formed can then be stored in a lined lagoon for melting by natural heat from the sun. The melt water can be reprocessed through a waste water treatment plant or discharged depending on the water quality.

While the apparatus 10 can efficiently be used during seasons when low temperature air is available to provide the freezing function, it is to be understood that artificial refrigeration can be used to supply sufficiently low temperature conditions, such as in brine tanks and the like. When used in cold climates during seasonal periods of favorably cold temperatures, the container 12 can simply be disposed outdoors to allow contact with ambient cold air. Similarly, the ice formed during the present processing can be stored in lined lagoons (not shown) for melting during favorably high temperature seasons or due to direct exposure to solar energy.

Figure 2:
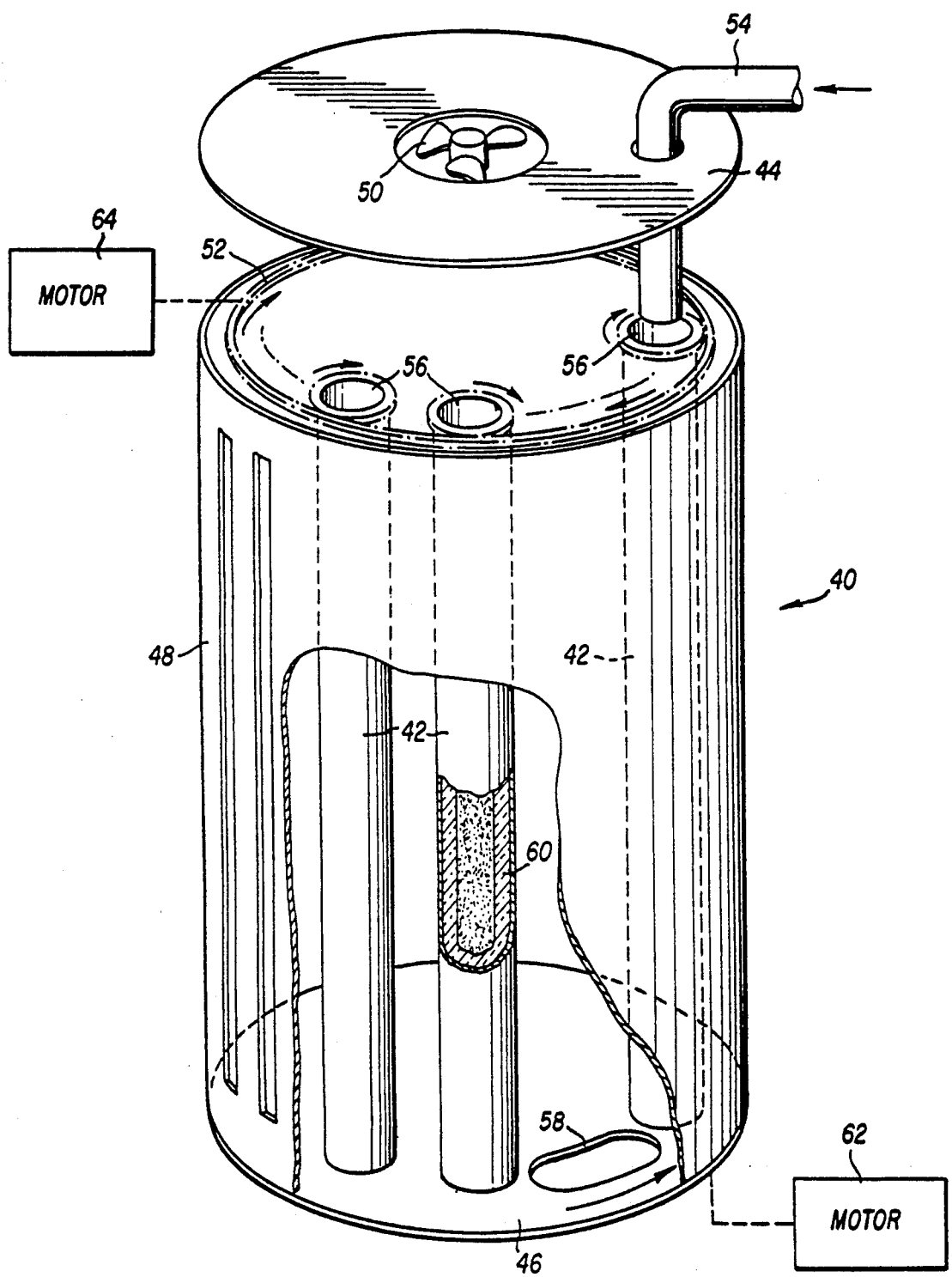

Referring now to FIG. 2, an apparatus 40 configured according to a further embodiment of the invention is seen to comprise a plurality of cylinders 42 which effectively correspond in structure and function to the cylindrical container 12 of FIGS. 1A through 1D. The cylinders 42 are arranged in a circular pattern and held between upper and lower base plates 44 and 46, the plates 44 and 46 defining with cylindrical walls 48 a cylindrical enclosure within which the cylinders 42 are vertically mounted. The walls 48 can be louvered to allow cold air intake from ambient during seasonally low temperatures with the louvers (not shown) being closed during summer to allow artificial refrigeration within the interior of the apparatus 40. A fan 50 can be disposed in either of the plates 44 or 46 so that cold air can be drawn through the apparatus 40 in an efficient manner to circulate cold air about the cylinders 42.

The cylinders 42 are rotated within the apparatus 40 by any conventional means such as a chain drive 52, the cylinders 42 being movable relative to the plates 44 and 46. As shown in FIG. 2, movement of the cylinders 42 occurs at a substantially constant rotational rate due to the action of the chain drive 52. Sludge is introduced into the interior of the cylinders 42 through a sludge pipe 54 which can be moved around the circular pattern within which the cylinders 44 are arranged with ports 56 being available for each of the cylinders 42 such that the sludge can be charged into said cylinders. The lower base plate 46 is provided with a sludge discharge slot 58, the plate 46 being rotatable into position such that the slot 58 is surmounted by a cylinder 42 from which concentrated sludge is discharged by gravity after sufficient dewatering has taken place according to the process of the invention. After sludge discharge through the slot 58, ice layer 60 is also discharged through the slot 58 on slight heating of the walls of the cylinders 42 in order to disattach the ice layer 60 from the cylinder. The base plate 46 can be rotated at a desired rate to bring the slot 58 into position for concentrated sludge discharge and ice discharge as would be determined by ambient air temperature. The rotation rate of the lower base plate 46 would decrease as the ambient cold temperature increases. It is to be understood that the lower base plate 46 would be rotated by a motor and associated gearing such as is represented by the motor 62. Similarly, the chain drive 52 is mounted for rotation and powered by a motor and associated gearing and the like as is represented by motor 64.

The operation of the cylinders 42 in FIG. 2 can be seen to be substantially identical to the function of the cylindrical container 12 as illustrated in FIGS. 1A through 1D. The cylinders 42 preferably take the form of pipe-like elements which are approximately 6" in diameter. The dimensions of the cylinders 42 and the materials from which said cylinders are formed are not critical, but are optimized for sludge holding capability, cost and the like.

One embodiment of the present invention includes a cylindrical container 12 fabricated from plexiglass having a six-inch diameter and a twenty and one-half inch height. The inside surface area 22 is three hundred twenty square inches. The volume of container 12 is one and nine-tenths gallons. Plexiglass container 12 is provided with two inch thick polyurethane end caps 20 and 24. The polyurethane material retards the axial freezing rate.

Ten tests were conducted rotating the six inch, plexiglass container 12 about a horizontal axis. Three different types of sludges, three rotational speeds and several initial solids concentrations were tested. As shown in Table I, the process was effective in increasing the final solids concentration in all sludges tested.

TABLE I

| Test No. | Type of Sludge | Volume (l) | Rotation Speed (rpm) | Rotation time (hours) | Initial Solids Conc. (%) |
|---|---|---|---|---|---|
| 1 | Water Treatment | 3.0 | 3 | 6.0 | 1.3 |
| 2 | Anaerobic Digester | 3.5 | 3 | 7.0 | 8.5 |
| 3 | Anaerobic Digester | 6.5 | 3 | 7.0 | 8.5 |
| 4 | Anaerobic Digester | 3.5 | 20 | 6.0 | 3.9 |
| 5 | Anaerobic Digester | 7.0 | 12 | 8.0 | 3.9 |
| 6 | Anaerobic Digester | 5.0 | 12 | 7.0 | 7.5 |
| 7 | Water Treatment | 6.0 | 12 | 24.0 | 2.0 |
| 8 | Activated Sludge | 6.0 | 12 | 22.5 | .6 |
| 9 | Activated Sludge | 6.0 | 12 | 24.0 | 1.0 |
| 10. | Activated | 6.0 | 12 | 20.5 | 1.4 |

TABLE I-continued

| | Sludge | | | |
|---|---|---|---|---|
| Test No. | Final Solids Conc. (%) | Solid Conc. in Ice (%) | Ice Thickness (cm) | Remarks |
| 1 | 2.3 | Negligible | 1.0 | Ice column was clear. |
| 2 | 14.4 | 4.5 | 1.2 | Ice column was colored. |
| 3 | — | — | 1.2 | Ice column was colored. |
| 4 | 7.0 | — | — | Ice column was transparent but contained coarse particles. |
| 5 | — | 0.9 | 1.2 | Ice column was clear. |
| 6 | 11.4 | 1.1 | — | Ice column was clear. |
| 7 | — | negligible | Completely frozen | Clearly defined separation between clear ice zone & sludge zone. |
| 8 | 5.7 | negligible | Completely Frozen | Clear Ice zone was 4.0 cm thick. |
| 9 | 4.4 | negligible | Completely Frozen | Clear Ice zone was between 3 and 4 cm. |
| 10 | 4.8 | 0.11 | Completely Frozen | Clear Ice zone was from 2 to 3 cm. |

The operation and preferred structure of the present invention can thus be appreciated from the description of the embodiments given above. However, it is to be recognized that the invention can be configured other than as explicitly described without departing from the scope and intent of the invention. Accordingly, the boundaries of the invention are provided by the definitions afforded by the appended claims.

I claim:

1. A method for separating a thermally crystalizable solvent including water from an admixture of the solvent and impurities including sludge, comprising the steps of:
   a. rotating a container holding the sludge about an axis of said container at a constant rate of rotation; and
   b. subjecting the container to a temperature sufficient to freeze the water in the sludge, the constant rate of rotation of the container being sufficient to form a layer of ice on the container surfaces and to maintain a thin layer of water between the ice layer and the sludge.

2. The method of claim 1 wherein the container comprises a cylinder rotated about its longitudinal axis.

3. The method of claim 2 wherein the temperature capable of freezing the water is imparted to the container by ambient low temperature air existing at least seasonally at the processing site.

4. The method of claim 2 wherein the temperature capable of freezing the water is imparted t the container by fluid in which the temperature has been artificially produced.

5. The method of claim 2 further comprising the step of discharging concentrated sludge from the container after sufficient sludge concentration negates further dewatering of the sludge.

6. The method of claim 5 further comprising the step of discharging the ice layer after sludge discharge.

7. The method of claim 6 wherein the ice layer is discharged by heating the walls of the container.

8. The method of claim 7 further comprising the step of melting the ice for further processing or discharge by subjection to solar energy.

9. A method for separating a thermally crystalizable solvent including water from an admixture of the solvent and impurities including sludge comprising the steps of:
   a. rotating a container holding the sludge about an axis of said container at a constant rate of rotation, said container having an external and internal surface,; and
   b. subjecting the external surface of the container to a temperature sufficient to freeze the water in the sludge, the constant rate of rotation of the container being sufficient to form a layer of ice on the internal container surface and to maintain a thin layer of water between the ice layer and the sludge.

10. The method of claim 9 wherein the container comprises a cylinder rotated about its longitudinal axis.

11. The method of claim 10 wherein the temperature capable of freezing the water is imparted to the container by ambient low temperature air existing at least seasonally at the processing site.

12. The method of claim 10 wherein the temperature capable of freezing the water is imparted to the container by fluid in which the temperature has been artificially produced.

13. The method of claim 10 further comprising the step of discharging concentrated sludge from the container after sufficient sludge concentration negates further dewatering of the sludge.

14. The method of claim 13 further comprising the step of discharging the ice layer after sludge discharge.

15. The method of claim 14 wherein the ice layer is discharged by heating the walls of the container.

16. The method of claim 15 further comprising the step of melting the ice for further processing or discharge by subjection to solar energy.

* * * * *